(12) United States Patent
Bosco

(10) Patent No.: US 9,493,035 B2
(45) Date of Patent: Nov. 15, 2016

(54) FLANGED HUB-BEARING UNIT

(71) Applicant: Domenico Bosco, Borgaro Torinese (IT)

(72) Inventor: Domenico Bosco, Borgaro Torinese (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/796,263

(22) Filed: Jul. 10, 2015

(65) Prior Publication Data

US 2016/0009131 A1 Jan. 14, 2016

(30) Foreign Application Priority Data

Jul. 11, 2014 (IT) .............................. TO2014A0561

(51) Int. Cl.
| | | |
|---|---|---|
| *F16C 13/02* | (2006.01) | |
| *B60B 27/06* | (2006.01) | |
| *B60B 27/00* | (2006.01) | |

(52) U.S. Cl.
CPC ......... *B60B 27/065* (2013.01); *B60B 27/0005* (2013.01); *B60B 27/0084* (2013.01); *B60B 27/0094* (2013.01); *B60B 27/0036* (2013.01)

(58) Field of Classification Search
CPC ..................... F16C 19/18; F16C 19/184; F16C 19/186; B60B 27/0005; B60B 27/001; B60B 27/0036; B60B 27/0094; B60B 27/065
USPC ................................................ 384/544, 589
See application file for complete search history.

(56) References Cited

U.S. PATENT DOCUMENTS

| | | | | |
|---|---|---|---|---|
| 5,333,939 A | * | 8/1994 | Krude | ................. B60B 27/0005 301/124.1 |
| 5,975,767 A | * | 11/1999 | Mizukoshi | .......... B60B 27/0005 277/321 |
| 6,203,441 B1 | * | 3/2001 | Iarrera | ................. B60B 27/0005 29/243.56 |
| 2003/0062764 A1 | * | 4/2003 | Vignotto | ............. B60B 27/0005 301/105.1 |
| 2007/0031079 A1 | * | 2/2007 | Komori | ................... B60B 27/00 384/589 |

(Continued)

FOREIGN PATENT DOCUMENTS

| | | |
|---|---|---|
| DE | 3400701 A1 | 7/1985 |
| EP | 2602123 A1 | 6/2013 |

(Continued)

*Primary Examiner* — Phillip A Johnson
(74) *Attorney, Agent, or Firm* — Bryan Peckjian; SKF USA Inc. Patent Dept.

(57) ABSTRACT

A hub-bearing unit includes a bearing unit having a stationary radially outer ring, a rotatable radially inner ring, and a double row of rolling bodies. The first row of rolling bodies, are axially outwards, interposed between the radially outer ring and a rotor-hub. The rolling bodies centers are located along a radius of a first circle, respective to a hub-bearing unit symmetry axis. The second row of rolling bodies, axially inwards, being interposed between the radially outer ring and the radially inner ring. The radially inner ring is assembled on top of the rotatable rotor-hub. A flange portion is axially external and steadily fixed to a tubular portion of the rotor-hub. The flange includes a plurality of fixing holes, whose axes are located along a radius of a second circle, respective to the hub-bearing unit symmetry axis. The first circle radius is greater than the second circle radius.

7 Claims, 1 Drawing Sheet

(56) References Cited

U.S. PATENT DOCUMENTS

| | | | | |
|---|---|---|---|---|
| 2008/0093914 A1* | 4/2008 | Mabuchi | ................... | B60B 3/04 |
| | | | | 301/105.1 |
| 2010/0119186 A1* | 5/2010 | Fukumura | ............... | B60B 27/00 |
| | | | | 384/544 |
| 2010/0296760 A1* | 11/2010 | Kapaan | ................ | B60B 7/0013 |
| | | | | 384/477 |

FOREIGN PATENT DOCUMENTS

| | | | |
|---|---|---|---|
| WO | 2005030499 | A1 | 4/2005 |
| WO | 2009051047 | A1 | 4/2009 |

* cited by examiner

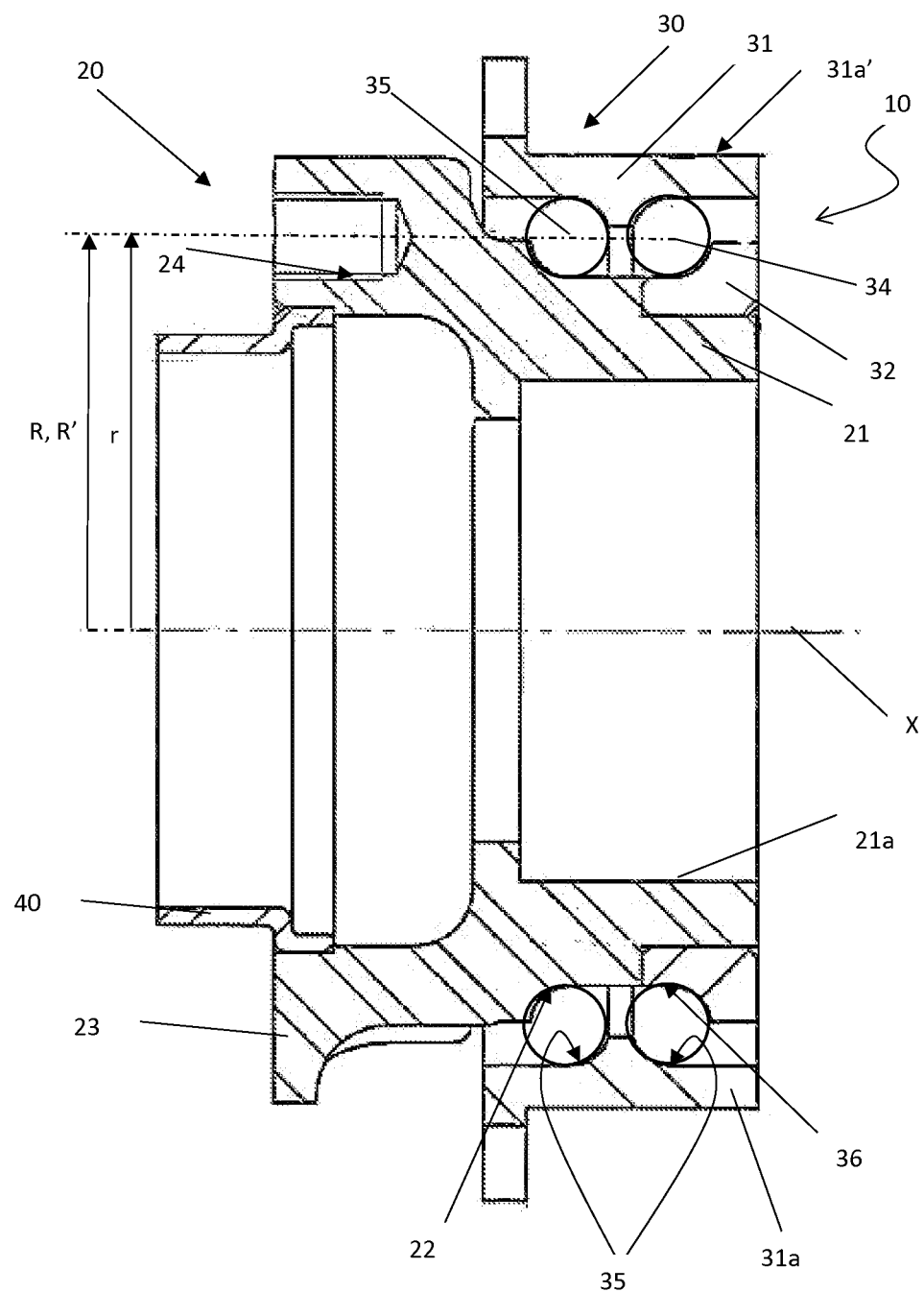

FLANGED HUB-BEARING UNIT

CROSS REFERENCE TO RELATED APPLICATIONS

This is a Non-Provisional Patent Application, filed under the Paris Convention, claiming the benefit of Italy Patent (IT) Application Number TO2014A000561, filed on 11 Jul. 2014, which is incorporated herein by reference in its entirety.

TECHNICAL FIELD

The present invention relates to a flanged hub-bearing unit, or the so-called rolling bearing of the third generation. Such a unit is suitable for applications where the outer ring of the bearing is stationary, in other words, for applications to a driving wheel of a motor vehicle.

BACKGROUND ART

Hub-bearing units of the flanged type for application to driving wheels of a motor vehicle are already known to the prior art. For example, Document EP 2602123 A1 describes a hub-bearing unit, in this case asymmetric, for the wheel of a motor vehicle, which includes a flanged hub, rotatable about a rotation axis, a flange integral with the flanged hub and transverse to the axis of rotation, a stationary ring disposed radially outside of the flanged hub and provided with rolling raceways axially spaced from one another, and two rows of rolling bodies arranged between the stationary ring and the flanged hub. The flanged hub integrally form a radially inner raceway for the row of rolling bodies axially external, while the radially inner raceway for the row of rolling bodies axially internal is formed on an inner ring of the bearing, press fitted on the radially outer flanged hub.

Such an embodiment, particularly in the case of heavy applications in terms of load transmitted, entails considerable local loads between rings and rolling bodies of the bearing; moreover, this embodiment does not permit to obtain large values of resistance of the bearing and its greater durability. Finally, it usually presents remarkable axial dimensions, due to the presence of the flange portion integral with the flanged hub and transverse to the axis of rotation.

Document US2010/119186 A1 discloses a cylindrical pilot portion to be fitted to an inner periphery of a wheel, formed at an inner diameter part of a brake rotor. A shape of a hub wheel, in particular, the shape on an outboard side is thus simplified, and the hub wheel can be formed at low cost through cold forging or the like.

Document WO2005/030499 A1 relates to a mechanical system comprising at least two parts where these parts are moveable relative to each other. The system comprises at least one non contacting power and data coupling device for transferring data between the first part and the second part. The type of power and data coupling device can be inductive, capacitive, radiographic and a combination of these.

Document WO 2009/051047 A1 discloses a bearing device for a wheel, in which circumferential play is minimized, a hub ring and an outer joint member of a constant velocity universal joint can be connected to each other with good workability, and the hub ring and the outer joint member are adapted to be separable from each other to provide the device with good maintainability.

Finally, document DE 34 00 701 A1 relates to a ring gear which is rotatably mounted in a rear axle transmission of a motorcycle and is integrally provided with a conical extension. The conical inner surface of a cone ring is driven onto the extension by means of attachment screws which penetrate said ring.

None of such documents is able to solve the above technical problem.

BRIEF SUMMARY OF THE PRESENT INVENTION

Aim of the present invention is to provide a hub-bearing unit for application on the driving wheel of a motor vehicle, which is free from the above mentioned drawbacks, particularly to provide a bearing high strength and a flanged hub of compact overall dimensions.

According to an aspect of the present invention a hub-bearing unit is disclosed, as defined in the enclosed independent claim.

Further embodiments of the invention, preferred and/or particularly advantageous, are described according to the characteristics as in the enclosed dependent claims.

BRIEF DESCRIPTION OF THE DRAWINGS

The invention will be now described by reference to the enclosed drawings, which show some non-limitative embodiments, namely:

FIG. 1 is an axial cross section of the hub-bearing unit according to a preferred embodiment of the present invention.

DETAILED DESCRIPTION

With reference to FIG. 1, a hub-bearing unit according to a preferred embodiment of the invention is referenced as a whole with 10.

The unit 10 comprises a hub 20 rotatable and a bearing unit 30. Throughout the present description and in the claims, terms and expressions indicating positions and directions, for example "radial" and "axial", are understood as referring to the axis of rotation X of the bearing unit 30. Expressions such as "axially inner" and "axially outer" refer instead to the mounted state on the vehicle and in this case, they are referred, respectively, to a wheel side and to a side opposite to the wheel side.

The bearing unit 30 comprises a radially outer ring 31, stationary, a radially inner ring 32, rotatable, and double row of rolling bodies 33, 34, in this example balls, interposed, respectively: the row of rolling bodies 33, axially external, between the radially outer ring 31 and the hub 20 and the row of rolling bodies 34, axially internal, between the radially outer ring 31 and the radially inner ring 32.

The radially outer ring 31 has a main tubular portion 31a axially extended, which internally defines the raceways 35 for the rolling bodies of the rows 33, 34.

The radially outer ring 31 and in particular the tubular portion 31a has a radially outer cylindrical surface 31a' suitable to be coupled with a cylindrical seat, formed in a fixed element of the vehicle, such as a knuckle of a suspension, of known type and not shown in the FIGURE. The cylindrical surface 31a' extends for the entire axial dimension of the radially outer ring 31 and has an axial dimension of the order of magnitude of that of the cylindrical seat of the knuckle.

The rolling bodies of the rows 33, 34 rotate, as well as on the radially outer ring 31, respectively on the hub 20 and on the radially inner ring 32. The ring 32 defines a radially inner raceway 36 for the axially inner row 34 of rolling bodies and is mounted on the flanged hub 20, which shaped as a rotor.

The hub 20 has a tubular portion 21 which defines an axially inner raceway 22 for the rolling bodies of the row 33, axially external, and a flange portion 23 axially external. The flange portion has a plurality of axial fixing holes 24, the axes of which are arranged along a circumference of radius r, with respect to the axis of symmetry X. These holes are the seats for as many fastening means (such as captive bolts, not shown in the FIGURE) that connect in a known way an element of the wheel of the motor vehicle, for example the brake disc (also of known type and not shown in the FIGURE), to the hub 20.

Advantageously, a bushing 40 for centering the wheel of the motor vehicle can be realized by means of a metal sheet, steel for example, and coupled to the flange portion 23 of the hub, preferably by means of a simple press-fit operation.

The flange portion 23 of the hub 20 is made in such a way that the radius r of the circumference of the axes of the fixing holes 24 is less than or at most equal (as in the example of FIG. 1) to the radius R, R' of the circumferences of the centers of the rolling bodies 33, 34 or at least to the radius R of the circumference of the centers of the rolling bodies 33, axially external, i.e. closest to the brake disc of the wheel of the motor vehicle, in the case of asymmetrical bearing. By means of this solution, the flanged hub assumes a shape as a rotor, i.e. its flange portion is very short and, in particular, does not radially extend beyond the diameter of the centers of the rolling bodies. The above solution is obtained by increasing the radius R of the circumference of the centers of the rolling bodies and obviously leaving unaltered, since it is a constraint of the of the motor vehicle design, the radius r of the circumference of the axes of the fixing holes 24.

The transmission of the motion from a drive shaft of the transmission unit of a motor vehicle (not shown) is guaranteed by the angular coupling of the hub 20 with a joint of known type and for this reason also not shown, for example, a constant velocity joint. Having increased the radius R of the circumference of the centers of the rolling bodies, the constant velocity joint can be designed so as to be inserted into the central space, left free by the hub-rotor. In this way a unit, very rigid and compact in size, is obtained. The transmission of the driving torque between the constant velocity joint and the hub 20 is realized by angularly coupling the radially outer wall of the joint with a radially inner cylindrical wall 21a of the tubular portion 21 of the hub 20. Always by way of example, the coupling can be achieved by means of knurling of the contact surfaces. It is also possible to realize the contact surfaces of the joint and the hub with a predetermined taper, in other words to transmit the motion by means of conical coupling between the contact surfaces.

Therefore, the solution conceived and declined in the presented embodiments allows to provide a hub-bearing unit with very small axial dimensions, as the hub is almost devoid of flange portions and of the relative axial dimensions and the joint is positioned so as to be radially inside the bearing. As a consequence of the increased radius of the centers of the rolling bodies, the greater diameter of the bearing also reduces the local loads between rings and rolling bodies of the bearing. finally, the greater diameter of the centers of the rolling bodies of the bearing ensures higher resistance and longer durability.

The major advantage of this solution is in the optimum ratio between load capacity and weight of the hub-bearing unit. In fact, the overall weight of the group is about 4 kg and is suitable for applications with vehicle axle weight of about 2000 kg. With a known solution, however, being equal the vehicle axle weight, the hub-bearing unit has a weight of about 6 kg.

Finally, the fact that the hub, which also works as inner ring, is made of steel, as well as the remaining part of the bearing, wholly eliminate the problem of the different thermal expansions existing in the solution with a light alloy hub.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A hub-bearing unit comprising:
a bearing unit comprising:
a stationary radially outer ring,
a rotatable radially inner ring, and
a double row of rolling bodies, the first row of rolling bodies are axially outwards, being interposed between the radially outer ring and a rotatable rotor-hub and whose centers of the rolling bodies are located along a first circle having a first circle radius, the first circle radius being respective to a symmetry axis of the hub-bearing unit, and the second row of rolling bodies are axially inwards, being interposed between the radially outer ring and the radially inner ring,
wherein the radially inner ring is assembled to a top of the rotatable rotor-hub, the rotor-hub comprising:
a tubular portion,
a flange portion axially external and steadily fixed to the tubular portion, the flange portion provided with a plurality of fixing holes, wherein axes of each fixing hole of the plurality of fixing holes are located along a second circle having a radius, with respect to the symmetry axis of the hub-bearing unit,
wherein the radius of the first circle of the rolling bodies centers is greater than the radius of the second circle of the fixing holes axes.

2. The hub-bearing unit according to claim 1, wherein the radius of the first circle of the centers of the rolling bodies of the axially outer first row is equal to the radius of a circle of the centers of the rolling bodies of the axially inner second row.

3. The hub-bearing unit according to claim 1, wherein the tubular portion of the rotor-hub defines a rolling race for the rolling bodies of the axially outer first row.

4. The hub-bearing unit according to claim 1, wherein the radially inner ring defines a rolling race for the rolling bodies of the axially inner second row.

5. The hub-bearing unit according to claim 1, further comprising a tubular portion of the radially outer ring, wherein the tubular portion comprises a cylindrical surface, which is radially external and configured to be coupled to a cylindrical seat of a knuckle of a vehicle suspension.

6. A hub-bearing unit comprising:
a bearing unit comprising:
a stationary radially outer ring, a rotatable radially inner ring, and a double row of rolling bodies, the first row of rolling bodies are axially outwards, being interposed between the radially outer ring and a rotatable rotor-hub and whose centers of the rolling bodies are located along a first circle having a first circle radius, the first circle radius being respective to a symmetry axis of the hub-bearing unit, and the second row of rolling bodies are axially inwards being interposed between the radially outer ring and the radially inner ring, wherein the radially inner ring is assembled to a top of the rotatable rotor-hub, the rotor-hub comprising:

a tubular portion, a flange portion axially external and steady fixed to the tubular portion, the flange portion provided with a plurality of fixing holes, wherein axes of each fixing hole of the plurality of fixing holes are located along a second circle having a radius, with respect to the symmetry axis of the hub-bearing unit, wherein the radius of the first circle of the rolling elements bodies centers is greater than the radius of the second circle of the fixing holes axes, and wherein transmission of driving torque between a constant velocity joint and the rotor hub is realized by angularly coupling the radially outer wall of the constant velocity joint radially inner cylindrical wall of the tubular portion of the hub.

7. A hub-bearing unit comprising:

a bearing unit comprising:

a stationary radially outer ring, a rotatable radially inner ring, and a double row of rolling bodies, the first row of rolling bodies are axially outwards, being interposed between the radially outer ring and a rotatable rotor-hub and whose centers of the rolling bodies are located along a first circle having a first circle radius, the first circle radius being respective to a symmetry axis of the hub-bearing unit, and the second row of rolling bodies are axially inwards, being interposed between the radially outer ring and the radially inner ring, wherein the radialy inner ring is assembled to a top of the rotatable rotor-hub, the rotor-hub comprising:

a tubular portion, a flange portion axially external and steadily fixed to the tubular portion, the flange portion provided with a plurality of fixing holes, wherein axis of each fixing hole of the plurality of fixing holes are located along a second circle having a radius with respect to the symmetry axis of the hub-bearing unit, wherein the radius of the first circle of the rolling elements bodies centers is greater than the radius of the second circle of the fixing holes axes, and further comprising a bushing, for centering a vehicle wheel, and wherein the bushing is coupled to the flange portion of the rotor-hub.

* * * * *